(12) United States Patent
Schaefer

(10) Patent No.: US 11,623,599 B2
(45) Date of Patent: Apr. 11, 2023

(54) AIRBAG WITH INFLATOR ATTACHMENT

(71) Applicant: ZF Passive Safety Systems US Inc., Washington, MI (US)

(72) Inventor: Manuel Schaefer, Berlin, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/226,461

(22) Filed: Apr. 9, 2021

(65) Prior Publication Data
US 2022/0324409 A1 Oct. 13, 2022

(51) Int. Cl.
B60R 21/231 (2011.01)
B60R 21/207 (2006.01)
B60R 21/235 (2006.01)

(52) U.S. Cl.
CPC ...... B60R 21/23138 (2013.01); B60R 21/207 (2013.01); B60R 21/235 (2013.01); *B60R 2021/23146* (2013.01); *B60R 2021/23509* (2013.01)

(58) Field of Classification Search
None
See application file for complete search history.

(56) References Cited

U.S. PATENT DOCUMENTS

| | | | | |
|---|---|---|---|---|
| 5,536,041 A * | 7/1996 | Acker | ............... | B60R 21/23138 280/740 |
| 5,556,128 A * | 9/1996 | Sinnhuber | ......... | B60R 21/23138 280/739 |
| 7,093,846 B2 * | 8/2006 | Reiter | ................... | B60R 21/205 280/728.2 |
| 7,364,191 B2 * | 4/2008 | Siegel | .................. | B60R 21/261 280/730.2 |
| 7,597,351 B2 * | 10/2009 | Kashiwagi | ............ | B60R 21/261 280/736 |
| 7,793,973 B2 * | 9/2010 | Sato | .................. | B60R 21/23138 280/730.2 |
| 7,926,838 B2 * | 4/2011 | Honda | .............. | B60R 21/23138 280/736 |
| 7,963,556 B2 * | 6/2011 | Loos | ....................... | B60R 21/26 280/740 |
| 8,764,050 B2 * | 7/2014 | Baumgartner | ...... | B60R 21/2171 280/730.2 |
| 9,180,833 B2 * | 11/2015 | Jo | ........................ | B60R 21/2171 |
| 9,545,893 B2 * | 1/2017 | Fujiwara | ............... | B60R 21/207 |

(Continued)

FOREIGN PATENT DOCUMENTS

JP 2010116134 A * 5/2010
JP 2019059434 A * 4/2019

OTHER PUBLICATIONS

PCT Search Report and Written Opinion for corresponding International Application Serial No. PCT/US2022/023574, dated Jun. 27, 2022, pp. 1-13.

*Primary Examiner* — Faye M Fleming
(74) *Attorney, Agent, or Firm* — Tarolli, Sundheim, Covell & Tummino LLP

(57) ABSTRACT

An apparatus for helping to protect an occupant of a vehicle seat includes an airbag defining an inflatable volume for receiving inflation fluid from an inflator having first and second ends. The airbag has a first sleeve configured to receive the first end of the inflator and a second end configured to receive the second end of the inflator. The first and second sleeves extend from the airbag.

22 Claims, 16 Drawing Sheets

(56) References Cited

U.S. PATENT DOCUMENTS

| | | |
|---|---|---|
| 2005/0248132 A1 | 11/2005 | Wheelwright |
| 2006/0103119 A1 | 5/2006 | Kurimoto et al. |
| 2007/0164546 A1 | 7/2007 | Kai et al. |
| 2007/0284859 A1* | 12/2007 | Kashiwagi ............ B60R 21/261 <br> 280/730.2 |
| 2007/0284862 A1* | 12/2007 | Kashiwagi .......... B60R 21/2346 <br> 280/740 |
| 2009/0039627 A1* | 2/2009 | Yokota .................. B60R 21/261 <br> 280/730.2 |
| 2011/0316263 A1* | 12/2011 | Lunt ..................... B60R 21/261 <br> 280/730.2 |
| 2013/0069347 A1 | 3/2013 | Jenny et al. |
| 2014/0210192 A1* | 7/2014 | Hotta .................... B60R 21/239 <br> 280/730.2 |
| 2015/0246656 A1* | 9/2015 | Fujiwara ........... B60R 21/23138 <br> 280/730.2 |
| 2022/0009440 A1* | 1/2022 | Schaefer ............... B60R 21/201 |

\* cited by examiner

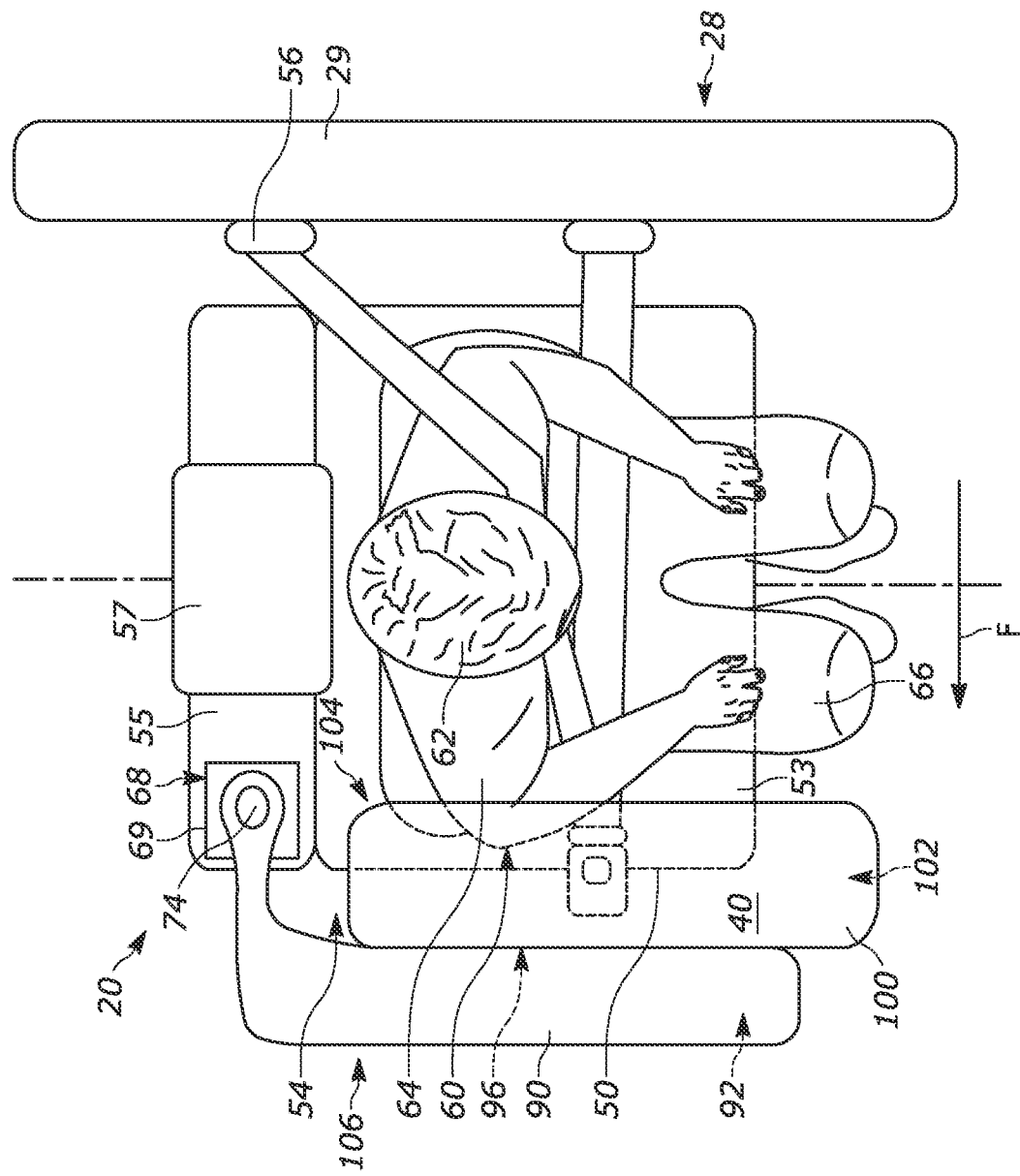

AIRBAG WITH INFLATOR ATTACHMENT

TECHNICAL FIELD

The present invention relates generally to vehicle airbags and, in particular, relates to an airbag having direct attachment to the inflator associated therewith.

BACKGROUND

It is known to inflate an airbag to help protect a vehicle occupant in the event of a side impact to a vehicle. The airbag is commonly stored in a deflated condition, together with an inflator, in a vehicle seat in which the occupant is seated. In the event of a side impact to the vehicle of a magnitude above a predetermined threshold, the inflator is actuated and the airbag is inflated into a position between the vehicle occupant and an adjacent side structure of the vehicle, such as an adjacent vehicle door. The airbag can help protect the vehicle occupant from forcefully striking or being struck by parts of the vehicle such as the door. The airbag can also help protect the vehicle occupant from objects which might intrude through the door.

SUMMARY

In one example, an apparatus for helping to protect an occupant of a vehicle seat includes an airbag defining an inflatable volume for receiving inflation fluid from an inflator having first and second ends. The airbag has a first sleeve configured to receive the first end of the inflator and a second end configured to receive the second end of the inflator. The first and second sleeves extend from the airbag.

In another example, an apparatus for helping to protect an occupant of a vehicle seat includes an airbag defining an inflatable volume for receiving inflation fluid from an inflator having first and second ends. The airbag has a first sleeve configured to receive the first end of the inflator and a second end configured to receive the second end of the inflator. The first sleeve is formed from a first panel folded over itself and inserted between second and third panels of the airbag defining the inflatable volume. First stitching extends from a first end positioned on the first sleeve to a second end positioned on a periphery of the second and third panels. Second stitching extends from a first end positioned on the first sleeve to a second end positioned on the periphery of the second and third panels. The first ends of the first and second stitching extend parallel to one another.

In another aspect, taken alone or in combination with any other aspect, the first sleeve includes multiple layers of fabric material stitched together and extending from the airbag.

In another aspect, taken alone or in combination with any other aspect, the first sleeve is formed from a first panel folded over itself and inserted between second and third panels of the airbag defining the inflatable volume.

In another aspect, taken alone or in combination with any other aspect, stitching extends through the first, second, and third panels.

In another aspect, taken alone or in combination with any other aspect, the stitching includes first stitching extending from a first end positioned on the first sleeve to a second end positioned on a periphery of the second and third panels. Second stitching extends from a first end positioned on the first sleeve to a second end positioned on the periphery of the second and third panels. The first ends of the first and second stitching extending parallel to one another.

In another aspect, taken alone or in combination with any other aspect, the second ends of the first and second stitching overlap one another on the periphery of the second and third panels.

In another aspect, taken alone or in combination with any other aspect, the portions of the first and second stitching positioned on the first sleeve extend along a length thereof.

In another aspect, taken alone or in combination with any other aspect, the first and second stitching positioned on the first sleeve extend parallel to a fold line over which the first panel is folded over itself to form the first sleeve.

In another aspect, taken alone or in combination with any other aspect, the first sleeve includes a base extending from a periphery of the airbag, an opening for receiving the first end of the inflator, and tabs aligned with the opening and positioned on opposite sides of the inflator.

In another aspect, taken alone or in combination with any other aspect, a clip extends around the tabs and the first end of the inflator for securing the same together.

In another aspect, taken alone or in combination with any other aspect, the first stitching extends around the opening.

In another aspect, taken alone or in combination with any other aspect, the second stitching extends around the first stitching and through the tabs.

In another aspect, taken alone or in combination with any other aspect, the airbag is formed as a center side air bag.

Other objects and advantages and a fuller understanding of the invention will be had from the following detailed description and the accompanying drawings.

BRIEF DESCRIPTION OF THE DRAWINGS

FIG. 4B is a top view of the airbag in the deployed condition.

DETAILED DESCRIPTION

Figure 1:
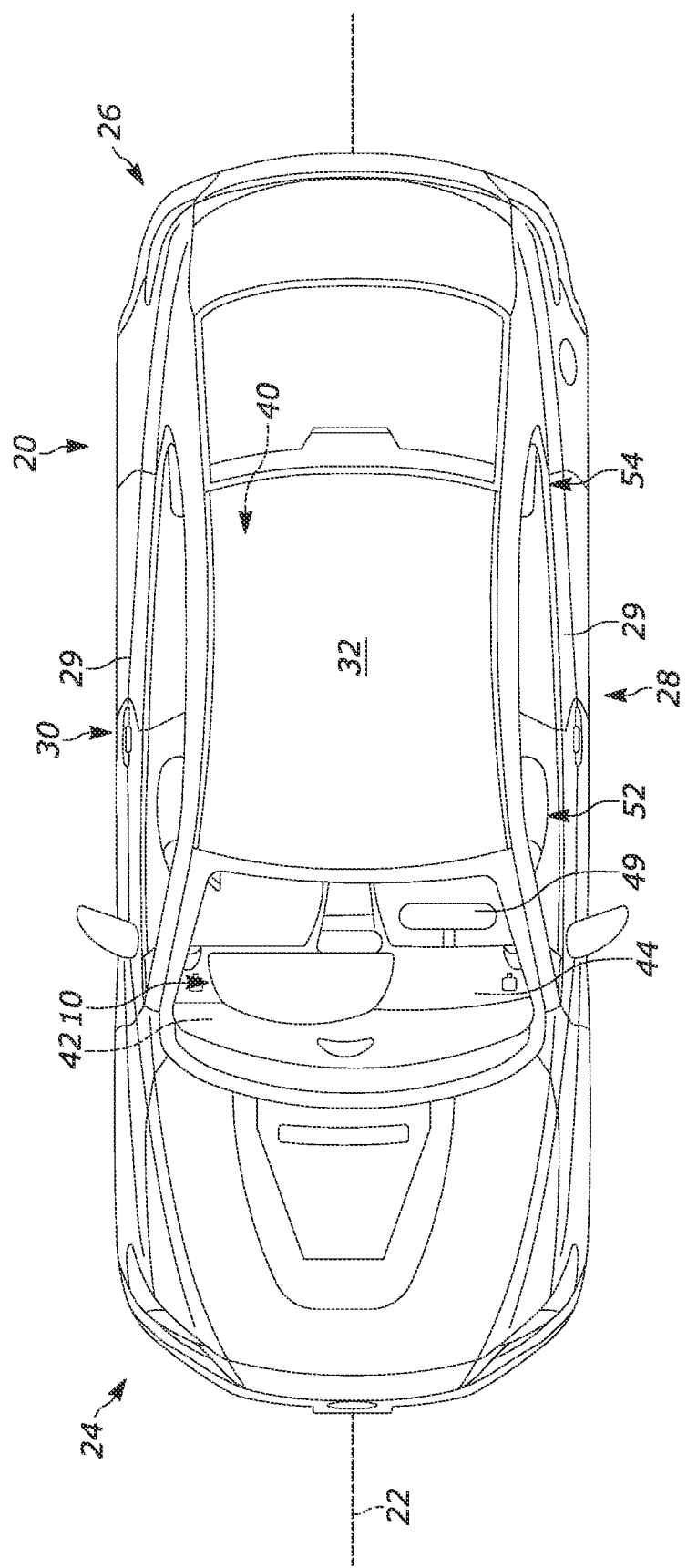
FIG. 1 is a top view of a vehicle including an example seat-mounted, occupant restraint system.
Figure 2:
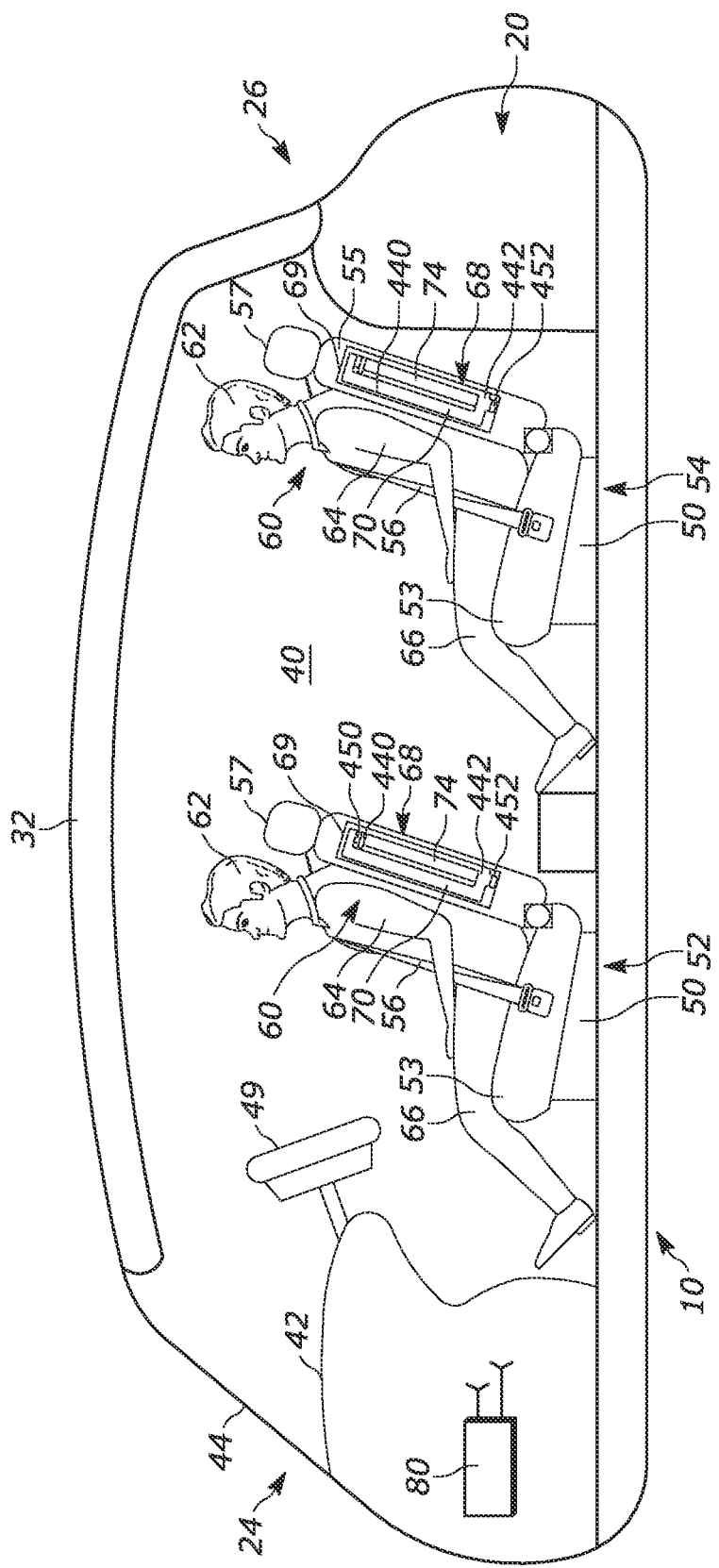
FIG. 2 is a schematic illustration of a cabin of the vehicle with an example seating arrangement and an example airbag of the restraint system in a stored condition.
Figure 3:
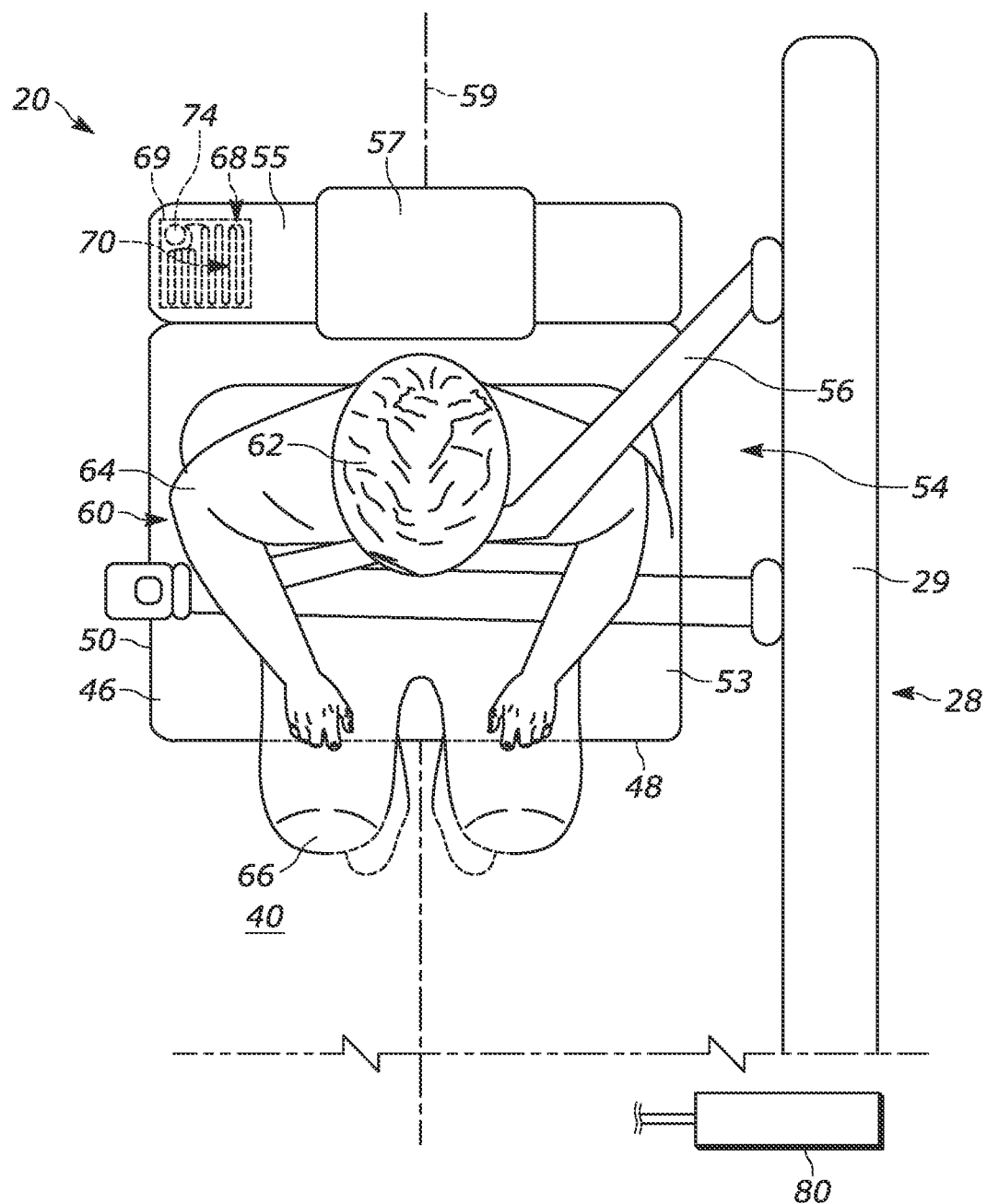
FIG. 3 is a top view of a seat with the airbag in the stored condition.

The present invention relates generally to vehicle airbags and, in particular, relates to an airbag having direct attachment to the inflator associated therewith. FIGS. 1-3 illustrate an example vehicle safety system in the form of an occupant restraint system 10 for a vehicle 20. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 is located between the instrument panel 42 and the roof 32. A steering wheel 49 is connected to the instrument panel 42 on the left side 28 of the vehicle 20.

Seats 50 are positioned in the cabin 40 and can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Each seat 50 extends along a fore-aft centerline 59 (see FIG. 3) and includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The occupant restraint system 10 includes at least one vehicle occupant protection device in the form of an inflatable airbag 70 housed/concealed in the seats 50 behind, for example, seat upholstery. Mounting the airbags 70 in the seats 50 is convenient because each airbag can be positioned in a location with a desired proximity to the occupant(s) 60 it is intended to help protect. This can help reduce the necessary inflatable volume of the airbags 70 and can also help provide a desired airbag deployment time without requiring an excessively high-volume inflator.

Figure 4A:
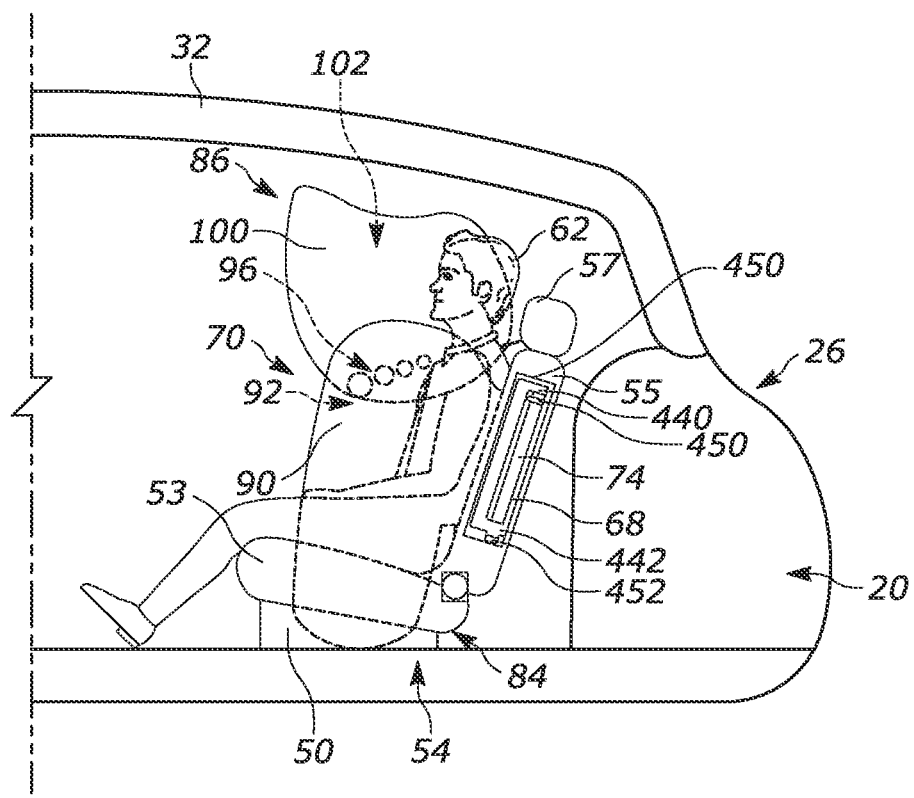
FIG. 4A is a side of the airbag in a deployed condition.

The airbag 70 is stored in a module 68 having a housing 69 made of a durable material such as plastic or metal. In the example configuration shown, the airbag modules 68 are mounted in the seat back 55 of each seat 50 and inboard of the occupant 60 associated with the seat back. The airbag 70 inflates and deploys upwards in the cabin 40 and inboard of the occupant 60, i.e., towards the vehicle centerline 22, as shown in FIGS. 4A-4B. In this manner, the airbag 70 is a center side air bag. Other occupant restraint systems (not shown) that can be constructed in accordance with the invention can include, for example, a curtain air bag, side impact air bags, inflatable seat belts, inflatable knee bolsters, and inflatable head liners.

The airbag 70 is at least one of rolled and folded before being placed in the housing 69 of the module 68. The module 68 is then placed within the seat back 55 of the seat 50 and covered with the seat upholstery and/or a door. An inflator 74 is positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided in each seat 50 in each row 52, 54. In other words, each seat 50 in the vehicle 20 can have an individual module 68 (with corresponding airbag 70 and inflator 74) associated therewith. Although the airbags within each seat 50 are identical for each row provided in the vehicle 20, the construction and operation of only the airbag associated with a left (driver) side 28 seat 50 in the rear row 54 is discussed for brevity.

As shown in FIGS. 4A-4B, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and the seat upholstery to open (e.g., via tear seam or door). This releases the airbag 70 to inflate and deploy from its stored condition behind the seat upholstery to a deployed condition extending into the cabin 40 inboard of and aligned with the seat 50 in the rear row 54. The airbag 70, while inflated, helps protect the vehicle occupant 60 in the rear row 54 by absorbing the impact of the occupant.

The airbag 70 inflates from its stored locations in the seat back 55 to its deployed condition. The airbag 70, when deployed, extends from a lower end 84 to an upper end 86. The airbag 70 includes a first airbag or portion 90 and a second airbag or portion 100. The first and second portions 90, 100 have respective inflatable volumes 92, 102. Openings 96 in the panels defining the airbag 70 fluidly connect the inflatable volumes 92, 102, as will be discussed.

The first portion 90 is connected to the seat 50 and fluidly connected to the inflator 74. The upper end 86 and second portion 100 are positioned adjacent the head 62 of the occupant 60 in the seat 50 and outboard of the first portion 90. An outboard side 104 of the airbag 70 faces towards the occupant 60 in the associated seat 50. An inboard side 106 faces away from the occupant 60 towards the side structure 29.

In its deployed condition, the airbag 70 is configured to extend substantially the entire depth of the seat 50 outboard of the associated occupant 60. The lower end 82 is configured to cover at least a portion of the occupant's knees and the upper portion of the legs 66. The upper end 86 is configured to extend vertically to a position sufficient to receive and help protect the occupant's head 62 and upper torso 64.

The extent of the airbag 70 deployment vertically and/or horizontally (as shown in FIGS. 4A-4B) can be adjusted in order to adjust the coverage of the airbags. To this end, the airbag 70 can be configured to extend further fore and/or aft in order to help protect the occupant 60 in the event of a side, oblique or offset collision. The inflated width of the airbag 70 in the inboard-outboard direction can also be adjusted.

Because the occupant 60 is belted, a side crash resulting in inboard occupant 60 movement causes the occupant to move in a path toward the airbag 70, as indicated generally by the arrow F in FIG. 4B. That said, the connection between the lower end 84 and the seat base 53, in combination with the engagement between the deployed airbag 70 and the adjacent seat 50 (not shown), act to limit or restrict inboard movement of the airbag away from the occupant 60 in response to occupant penetration. In other words, one or more of the seats 50 in the rear row 54 can help prevent or limit airbag 70 movement in the direction F.

The inflation rate, deployment trajectory, and shape of the airbag 70 can be configured to optimize the protection of occupants 60 having a wide range of sizes and/or seating positions. To this end, the airbag 70 can optionally be used in combination with tethers and/or have multiple chambers to achieve appropriate or desired deployment characteristics suitable for the vehicle interior and/or seating position of the occupants 60. These features can be configured to help protect occupants 60 that are slouched, reclined, etc.

With this in mind, FIGS. 5-15 illustrate example components and manufacturing steps for assembling the airbag 70 with the inflator 74. To this end, the airbag 70 includes a series of panels 120, 170, 220, 250, 290, 310 interconnected to define the first and second portions 90, 100 and inflatable volumes 92, 102 thereof for receiving inflation fluid from the inflator 74. A weave direction of each panel 120, 170, 220290, 310 is indicated at W.

Figure 5:
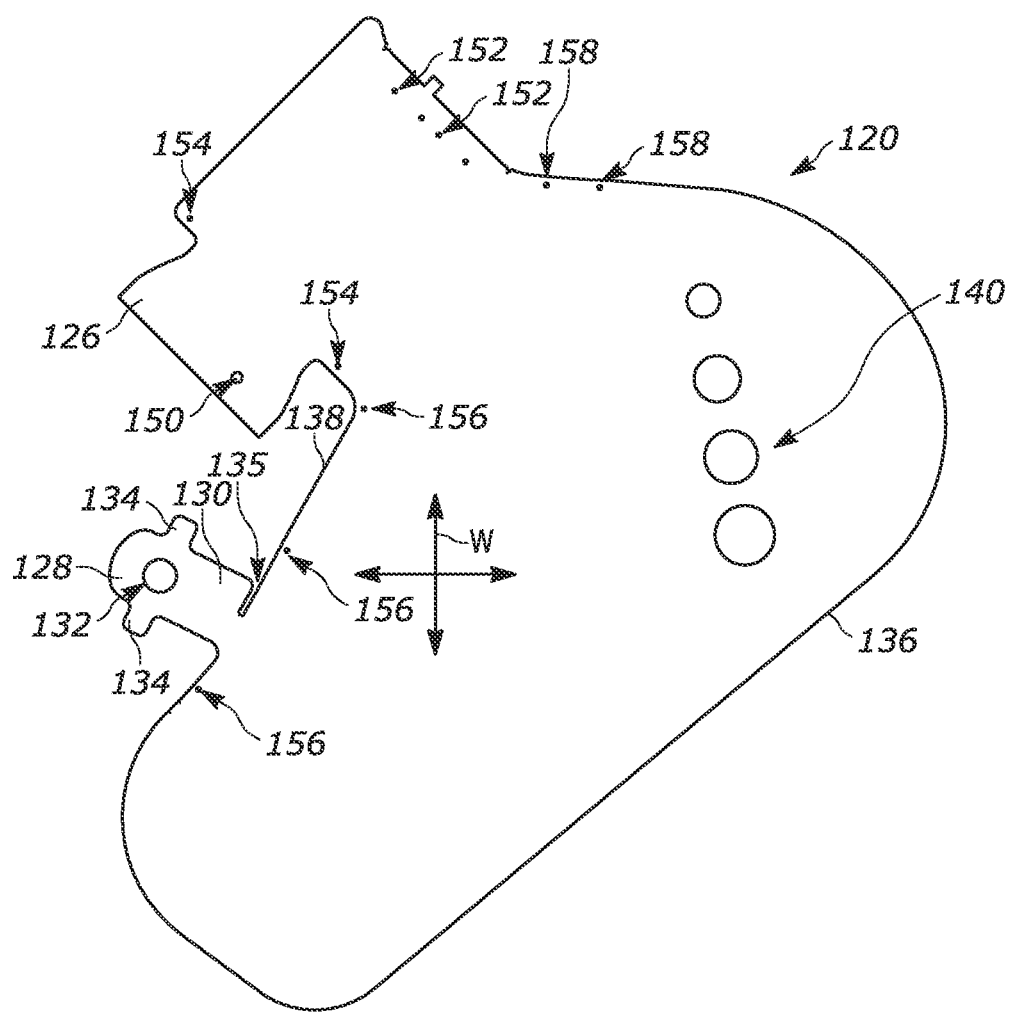
FIG. 5 is a top view of a first panel of the airbag.

The first panel 120 is illustrated in FIG. 5 and includes first and second projections 126, 128 extending outward therefrom. The first projection 126 can have a frustoconical shape. The second projection 128 includes a base 130 connected to the first panel 120. An opening 132 extends through base 130. Tabs 134 extend outward from the base 120 on opposite sides of the opening 132. As shown, the tabs 134 are diametrically opposed from one another about the opening 132. A notch 135 extends into the base 130 at an end thereof opposite the tabs 134.

Inflation openings 140 extend through the interior of the first panel 120. The openings 140 are aligned linearly with one another and can have different sizes (as shown) or be the same size (not shown). In the example shown in FIG. 5, the openings 140 increase in size along a generally straight line. A first longitudinal edge 136 extends from the first projection 126, around the openings 140, and to the second projection 128. A second longitudinal edge 138 extends between the first and second projections 126, 128.

A series of alignment openings is provided along the edges 136, 138 for helping to the align the first panel 120 with other panels in the airbag 70 during assembly thereof. In one example, first, second, third, fourth, and fifth alignment openings 150, 152, 154, 156, 158 are provided in the first panel 120. More or fewer openings alignment openings are contemplated. As shown, the first alignment opening 150 is provided on the first projection 126. The second alignment openings 152 are provided opposite the first projection 126 and along the edge 136. The third alignment openings 154 are provided on opposite sides of the first projection 126. The fourth alignment openings 156 are provided between the first and second projections 126, 128 along the edge 138. The fifth alignment openings 158 are provided along the edge 136 and relatively closer to the inflation openings 140.

Figure 6:
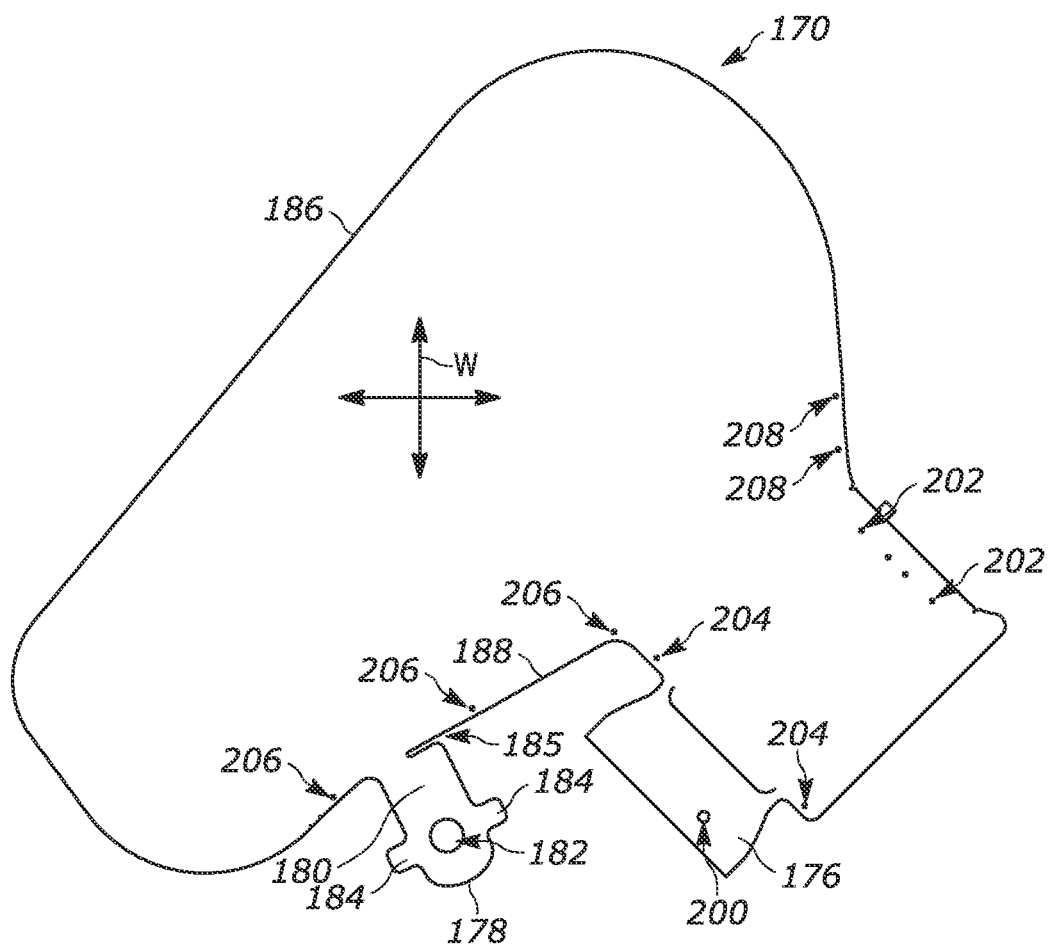
FIG. 6 is a top view of a second panel of the airbag.

FIG. 6 illustrates the second panel 170, which is a mirror image of the first panel 120 but with the inflation openings 140 omitted. That said, features in the second panel 170 corresponding with features in the first panel 120 are given corresponding reference numbers that are 50 greater than in the first panel, e.g., the edges 136, 138 in the first panel 120 correspond with the edges 186, 188 in the second panel 170. Consequently, a detailed description of the second panel 170 is omitted in the interest of brevity.

Figure 7:
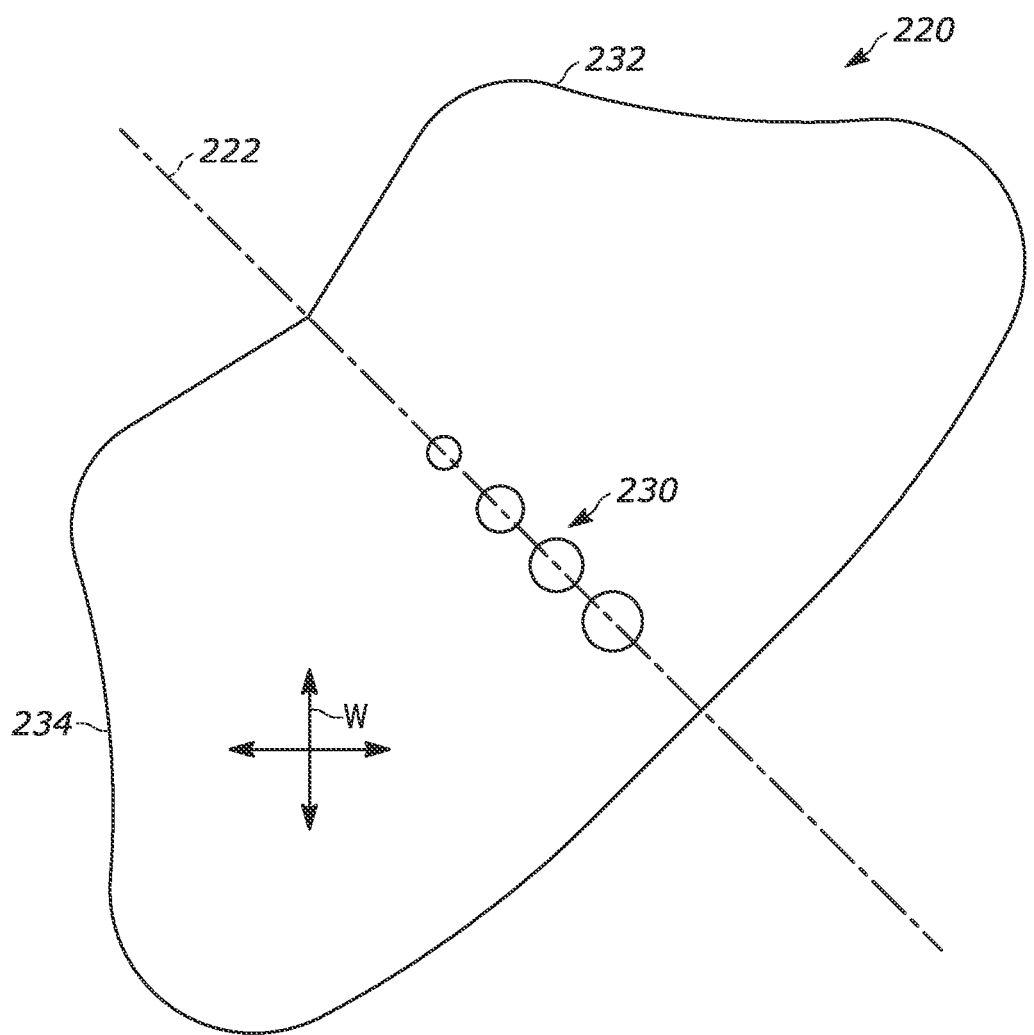
FIG. 7 is a top view of a third panel of the airbag.

The third panel 220 is illustrated in FIG. 7 and is generally symmetric about a centerline 222. The third panel 220 includes first and second longitudinal edges 232, 234 extending on opposite sides of the centerline 222 and intersecting one another at locations on the centerline. Inflation openings 230 extend through the interior of the third panel 220. The openings 230 are aligned linearly with one another and can have different sizes (as shown) or be the same size (not shown). In the example shown in FIG. 7, the openings 220 increase in size and are positioned along the centerline 222. In any case, the inflation openings 220 have the same size and arrangement as the inflation openings 140 in the first panel 120.

Figure 8:
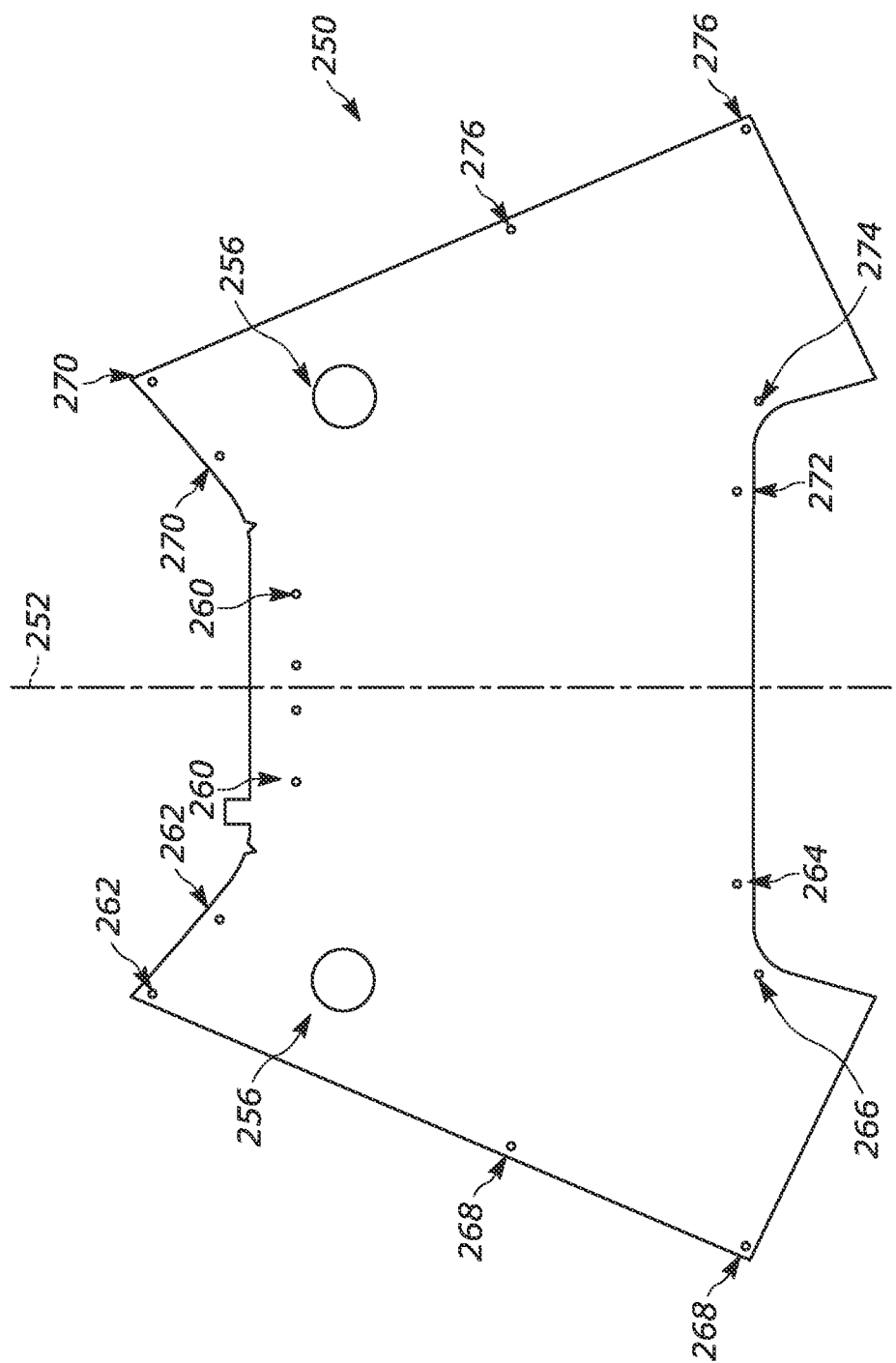
FIG. 8 is a top view of a fourth panel of the airbag.

The fourth panel 250 is illustrated in FIG. 8 and is substantially symmetric about a centerline 252. Openings 256 extend through the interior of the fourth panel 250 and are positioned on opposite sides of the centerline 252. A series of alignment openings is provided along the periphery of the fourth panel 250 for helping to the align the fourth panel with other panels in the airbag 70 during assembly thereof. As shown, alignment openings 260, 262, 270 are provided along the top of the fourth panel 250. Alignment openings 262, 268 are provided along the left side of the fourth panel 260. Alignment openings 264, 266, 272, 274 are provided along the bottom of the fourth panel 260. Alignment openings 270, 276 are provided along the right side of the fourth panel 260. More or fewer openings alignment openings are contemplated.

Figure 9:
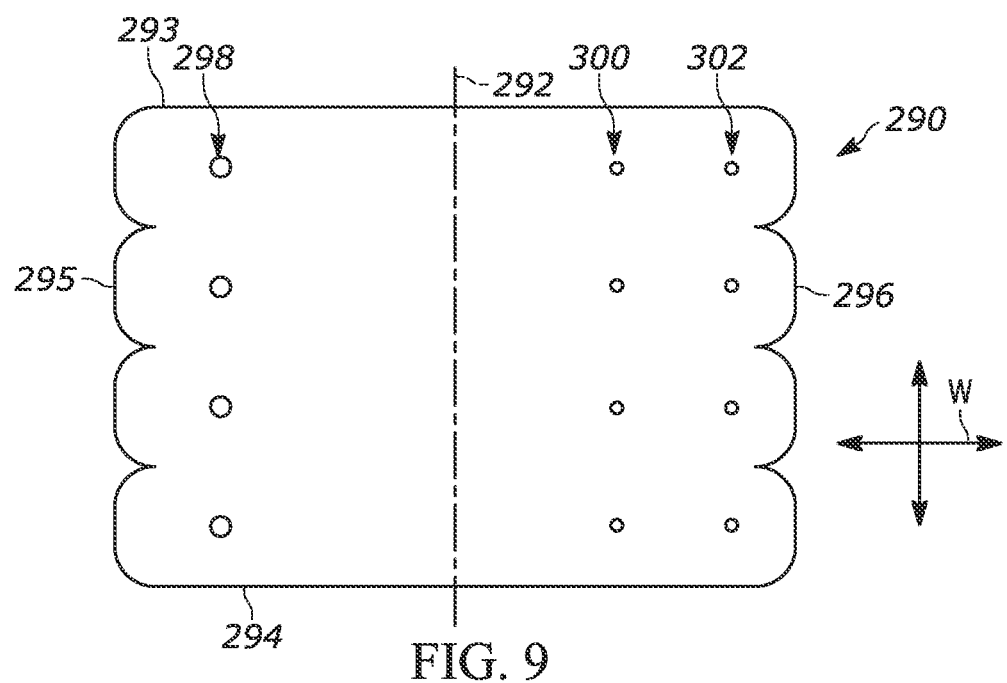
FIG. 9 is a top view of a fifth panel of the airbag.

The fifth panel 290 is shown in FIG. 9 and extends generally along a centerline 292. A pair of longitudinal edges 293, 294 extend parallel to one another and transverse, e.g., perpendicular, to the centerline 292. A pair of edges 295, 296 extend on opposite sides of the centerline 292 and interconnect the edges 293, 295. As shown, the edges 293, 294 are straight and the edges 295, 296 are formed from a series of curves arranged end-to-end. The edges 295, 296 are symmetric with one another about the centerline 292.

Rows of openings are provided between the edges 295, 296 and extend parallel to the edges 293, 294. The numbers of rows corresponds with the number of curves in the edges 295, 296. Each row includes a first opening 298 positioned adjacent the edge 293, a second opening 300 positioned adjacent the edge 294, and a third opening 302 positioned between the first and second openings. The second and third openings 300, 302 are positioned on the same side of the centerline 292. As shown, four rows of openings 298, 300, 302 are provided, corresponding with and aligned between the four curves in each edge 295, 296.

Figure 10:
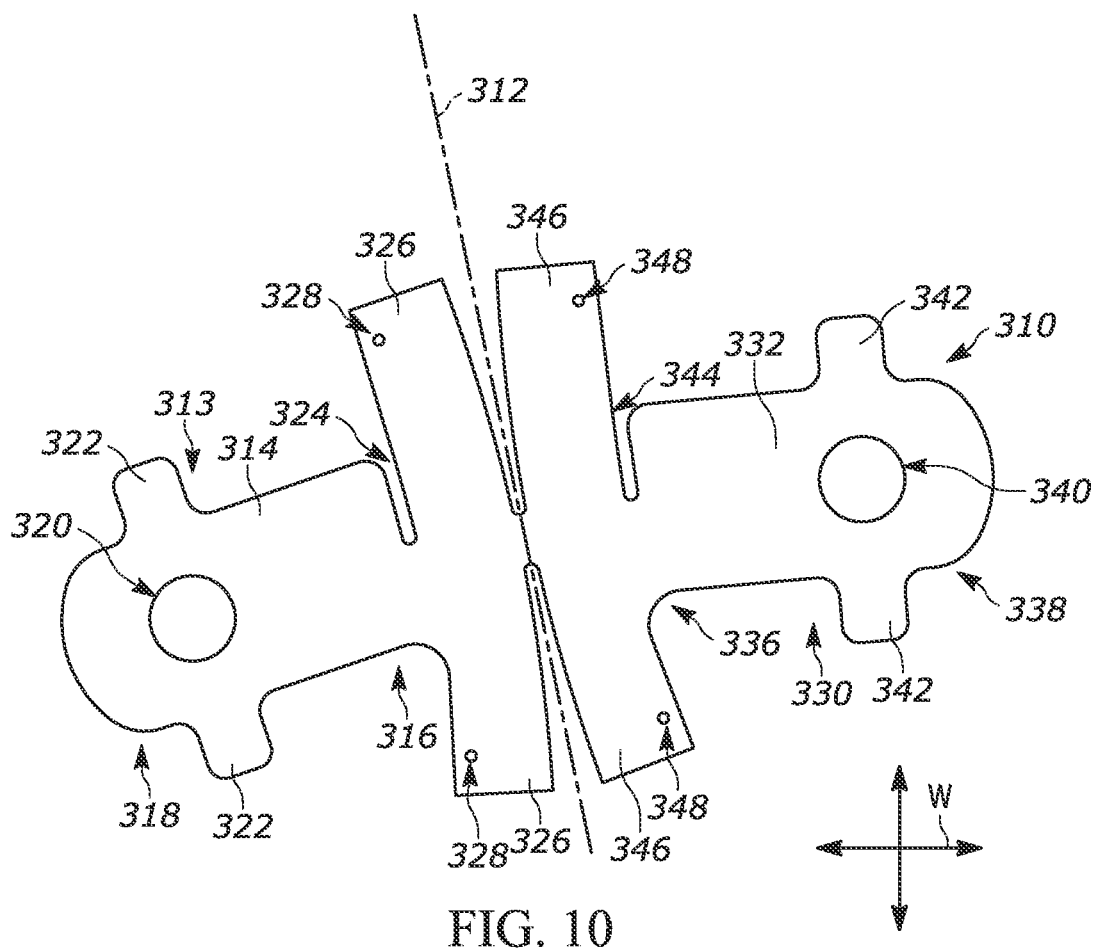
FIG. 10 is a top view of a sixth panel of the airbag.

The sixth panel 310 is shown in FIG. 10 and is symmetric about a centerline 312. Projections 313, 330 extend in opposite directions from the centerline 312 and from one another. The first projection 313 includes a base 314 extending from a first end 316 positioned adjacent the centerline 312 to a second, free end 318. An opening 320 extends through the second end 318. Tabs 322 extend from the second end 318 and radially outward relative to the opening 320. As shown, the tabs 322 are diametrically opposed from one another about the opening 320.

A notch 324 is formed in the first end 316 of the first projection 313. A pair of tabs 326 extend outward from the first end 316 in opposite directions from one another and generally parallel to the centerline 312. An alignment opening 328 is provided in a free end of each tab 326.

The second projection 330 includes a base 332 extending from a first end 336 positioned adjacent the centerline 312 to a second, free end 338. An opening 340 extends through the second end 338. Tabs 342 extend from the second end 338 and radially outward relative to the opening 340. As shown, the tabs 342 are diametrically opposed from one another about the opening 340.

A notch 344 is formed in the first end 336 of the second projection 330. A pair of tabs 346 extend outward from the first end 336 in opposite directions from one another and generally parallel to the centerline 332. An alignment opening 348 is provided in the free end of each tab 346.

Figure 11:
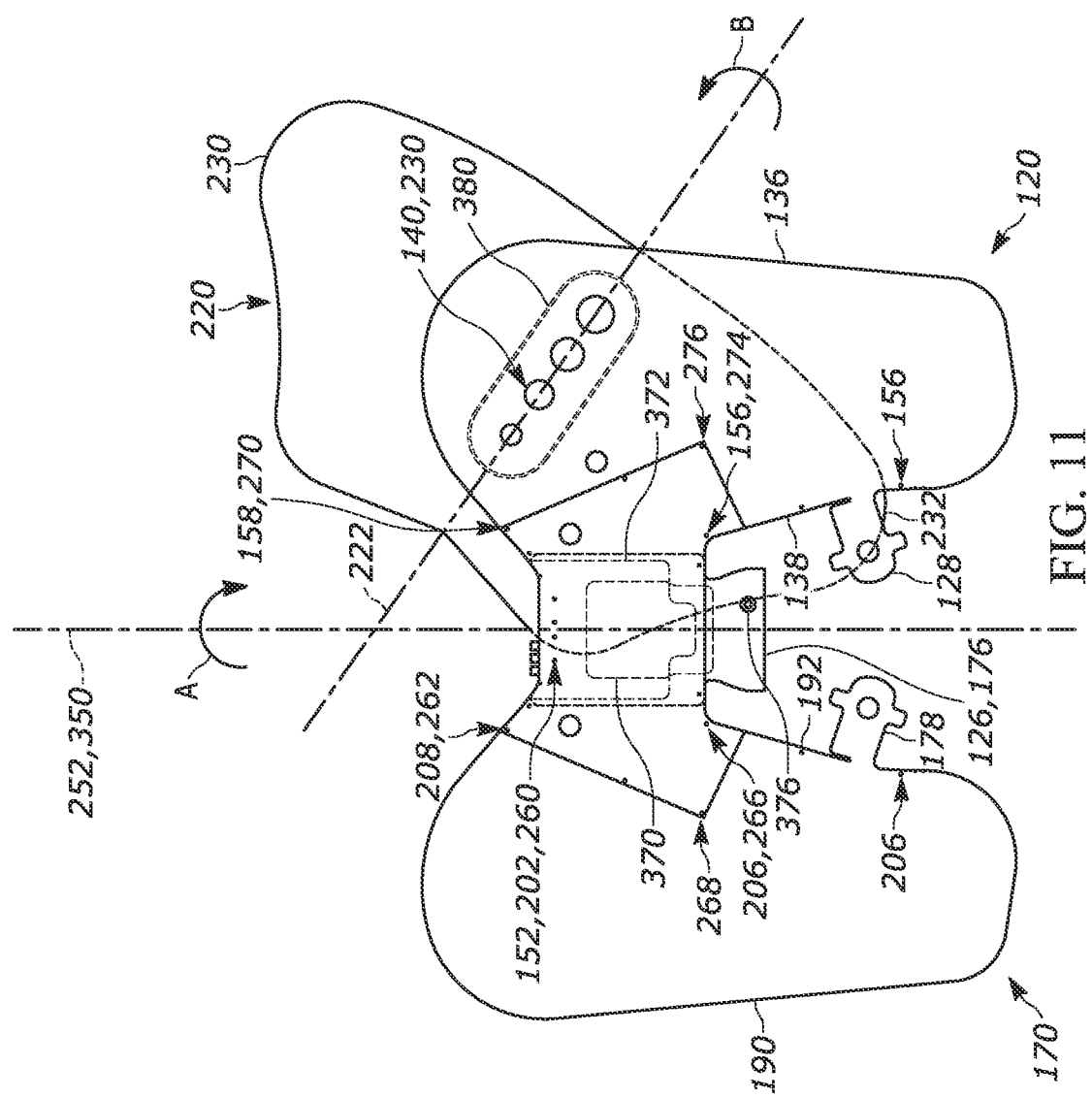
FIG. 11 is a top view of a first stage of assembling the airbag.

FIGS. 11-14 illustrate steps for assembling the panels 120, 170, 220, 250, 290, 310 into the airbag 70. Referring to FIG. 11, the first and second panels 120, 170 are symmetrically arranged about a centerline 350 with the first projection 126 on the first panel aligned with and overlying the first projection 176 on the second panel. The second and third alignment openings 152, 154 on the first panel 120 are aligned with the second and third alignment openings 202, 204, respectively, on the second panel 170. In this orientation, the second projections 128, 178 extend towards the centerline 350 and one another.

The third panel 220 is positioned behind (as shown) the first panel 120 with the inflation openings 230 in the third panel aligned with the inflation openings 140 in the first panel. This causes the centerline 222 of the third panel 220 to extend towards and intersect the centerline 350.

The fourth panel 250 is positioned on top of the first panel 120 with the centerline 252 bifurcating the overlapping first projections 126, 176 and being coincident with the centerline 350. The first alignment openings 260 are aligned with the second alignment openings 152, 202 in the second and third panels 120, 170. The third and fourth alignment openings 264, 266 are aligned with one of the third alignment openings 204 and one of the fourth alignment openings 206 in second panel 170, respectively. The seventh and eighth alignment openings 272, 274 are aligned with one of the third alignment openings 154 and one of the fourth alignment openings 156 in second panel 170, respectively.

Stitching is provided to secure the panels 120, 170, 220, 250 to one another. In particular, stitching 370, 372 interconnects and extends through the first, second, third, and fourth panels 120, 170, 220, 250. Stitching 374 extends around the aligned openings 150, 200 in first projections 126, 176. Stitching 380 extends around the aligned inflation openings 140, 220 and through both of the panels 120, 220.

Figure 12A:
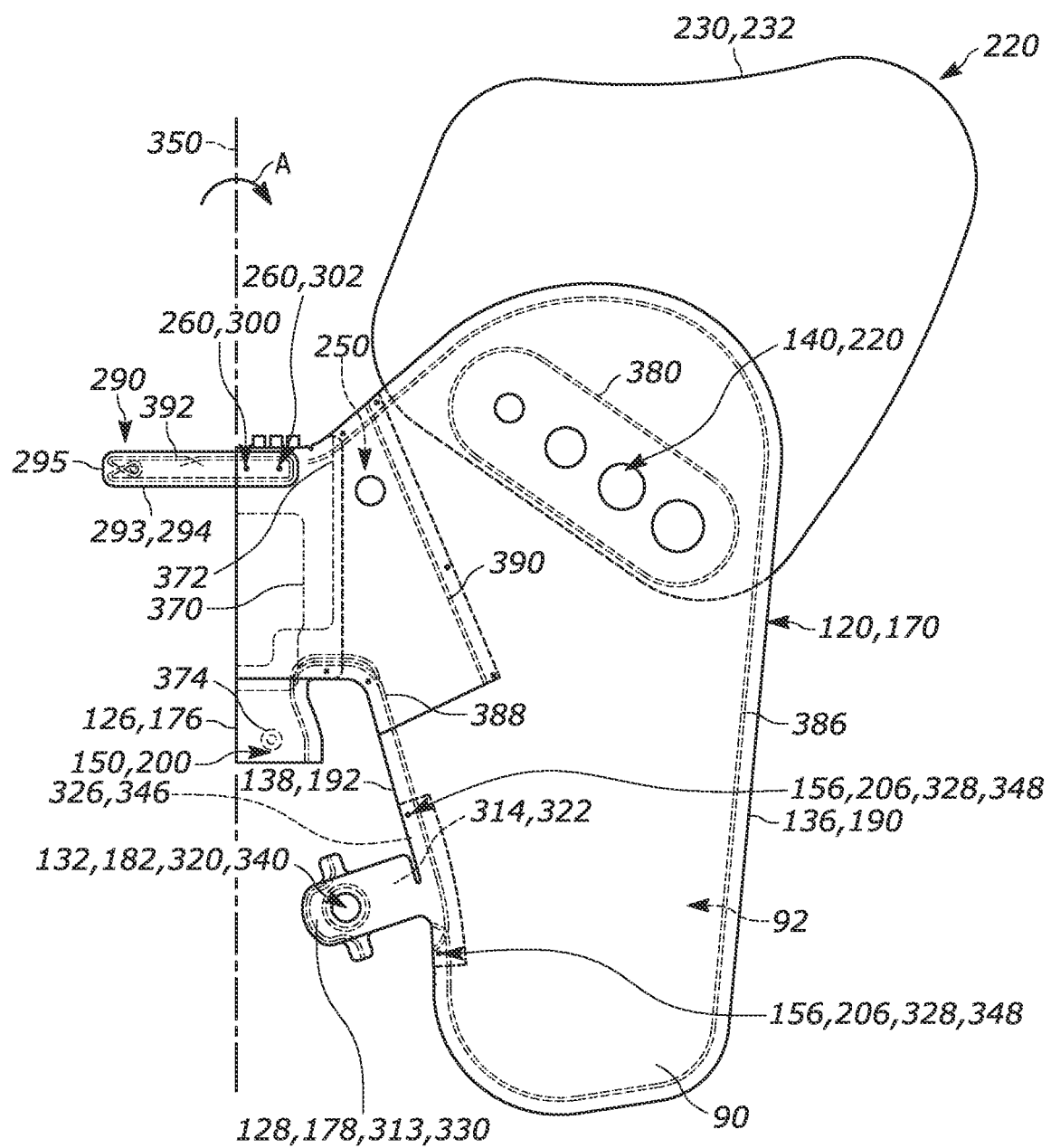
FIG. 12A is a top view of a second stage of assembling the airbag.
Figure 12B:
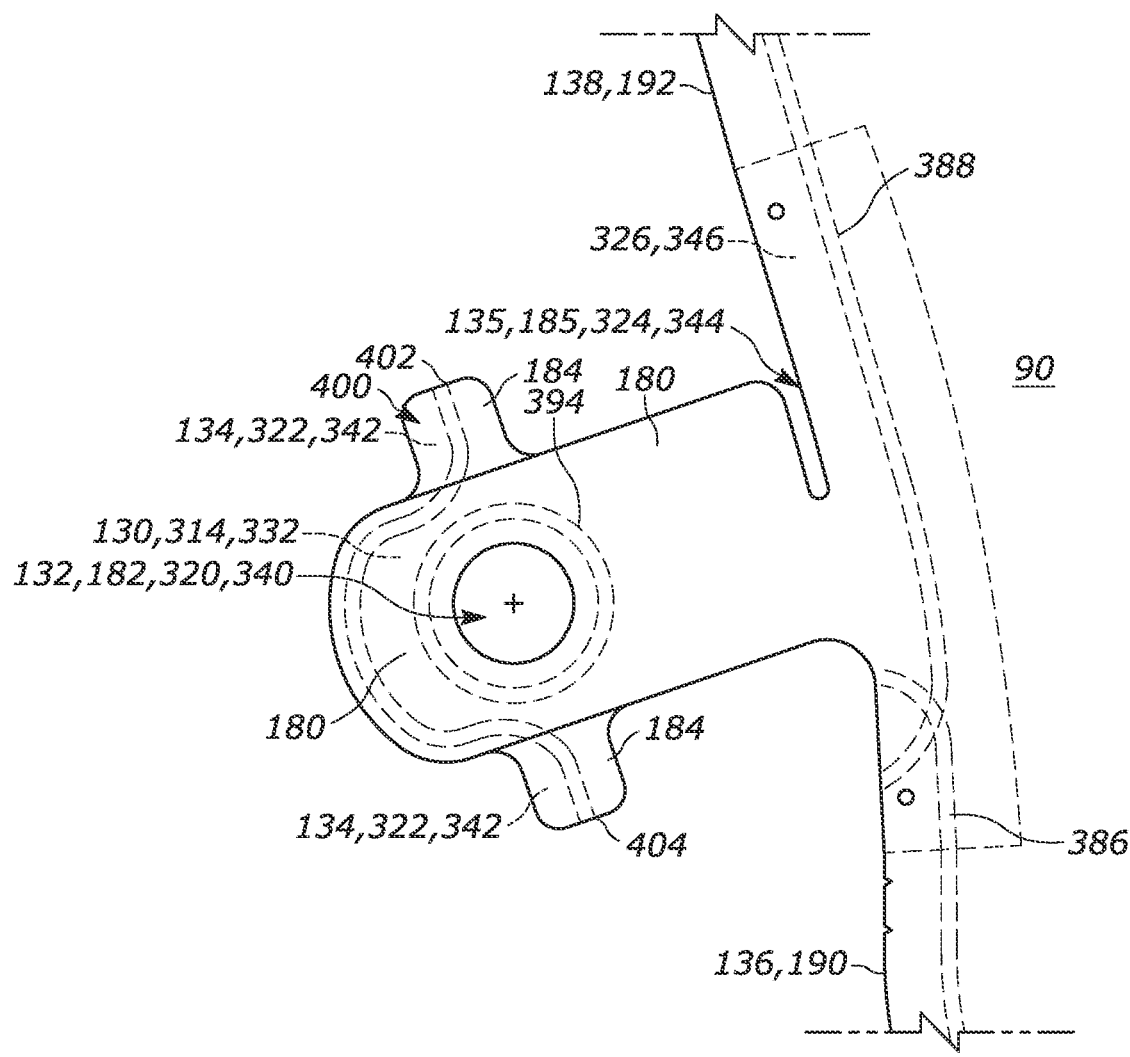
FIG. 12B is an enlarged view of a portion of FIG. 12A.

Referring to FIGS. 12A-12B, the second and fourth panels 170, 250 are folded over the centerline 350 in the manner indicated at A such that the second panel overlays and is aligned with the first panel 120. In other words, the second panel 170 is folded over such that the edges 136, 190 overlay one another and the edges 138, 192 overlay one another.

The second projections 128, 178 are also aligned with one another but do not overlay or engage one another. Rather, the sixth panel 310 (see also FIG. 10) is positioned between the aligned second projections 128, 178. More specifically, the sixth panel 310 is folded over the centerline 312 such that the bases 314, 332 overlay one another, the tabs 322 overlay the tabs 342, the tabs 326 overlay the tabs 346, and the openings 320, 340 are aligned with one another.

The folded over sixth panel 310 is then inserted between the aligned second projections 128, 178 such that the openings 132, 182, 320, 340 are aligned with one another, the tabs 134, 184, 322, 342 are aligned with one another, the notches 135, 185, 324, 344 are aligned with one another, and the folded over tabs 326, 346 extend between the panels 120, 170 along both overlaid edges 136, 190 and 138, 192, respectively.

Stitching 386 extends through and interconnects the edges 136, 190. Stitching 388 extends through and interconnects the edges 138, 192. The stitching 388 extends to and along the length of the overlapping first projections 126, 176. The stitching 386 can overlap the stitching 388 in the area of the tabs 326, 346. The stitching 386, 388 interconnects the first and second panels 120, 170 in a fluid-tight manner so as to define the inflatable volume 92 of the first portion 90.

Stitching 370, 372 also extends through the first and second panels 120, 170 in portions thereof adjacent the centerline 350 (FIG. 12A). Stitching 374 extends through the first projections 126, 176 and encircles the openings 150, 200. Stitching 390 extends through the panels 120, 170, 250 to form a chute that direction incoming inflation fluid to the lower end 84 of the airbag 70.

Referring further to FIG. 9, the fifth panel 290 is folded in an accordion manner along the centerline 292 such that all the edges 295 overlay one another and all the edges 296 overlay one another. This aligns all the first openings 298 with one another, all the second openings 300 with one another, and all the third openings 302 with one another.

The end of the fifth panel 290 bearing the overlaid edges 296 is inserted between the panels 120, 170 until the aligned second openings 300 and aligned third openings 302 are aligned with the openings 260 in the folded-over fourth panel 250. Stitching 392 extends through the folded fifth panel 290 and the overlaid panels 120, 170, 250 and around the openings 298 and aligned openings 260, 300 and 260, 302, respectively, in the manner shown.

Referring to FIG. 12B, stitching 394 extends through the overlapping bases 130, 180, 314, 332 of the respective panels 120, 170, 310 and encircles the aligned openings 132, 182, 320, 340. Additional stitching 400 extends through the overlapping bases 130, 180, 314, 332. In particular, the stitching 400 initiates at an end 402 along the periphery of the overlapping tabs 134, 184, 322, 342, continues to the overlapping bases 130, 180, 314, 332 and partially around the openings 132, 182, 320, 340, extends across the other overlapping tabs, and terminates at an end 404 along the periphery of the other tabs.

The stitching 400 can include backtack (not shown) at each respective ends 402, 404 and on opposite sides of the interconnected panels 120, 170, 310 to prevent loosening of the stitching. As shown, the portions of the stitching 400 extending through the tabs 134, 184, 322, 342 are generally aligned with one another on opposite sides of the openings 132, 182, 322, 342, i.e., the stitching portions are diametrically opposed to one another about the openings. The portion of the stitching 400 extending through the bases 130, 180, 314, 332 extends substantially parallel to/is generally concentric with the stitching 394 around the openings 132, 182, 320, 340.

Figure 13:
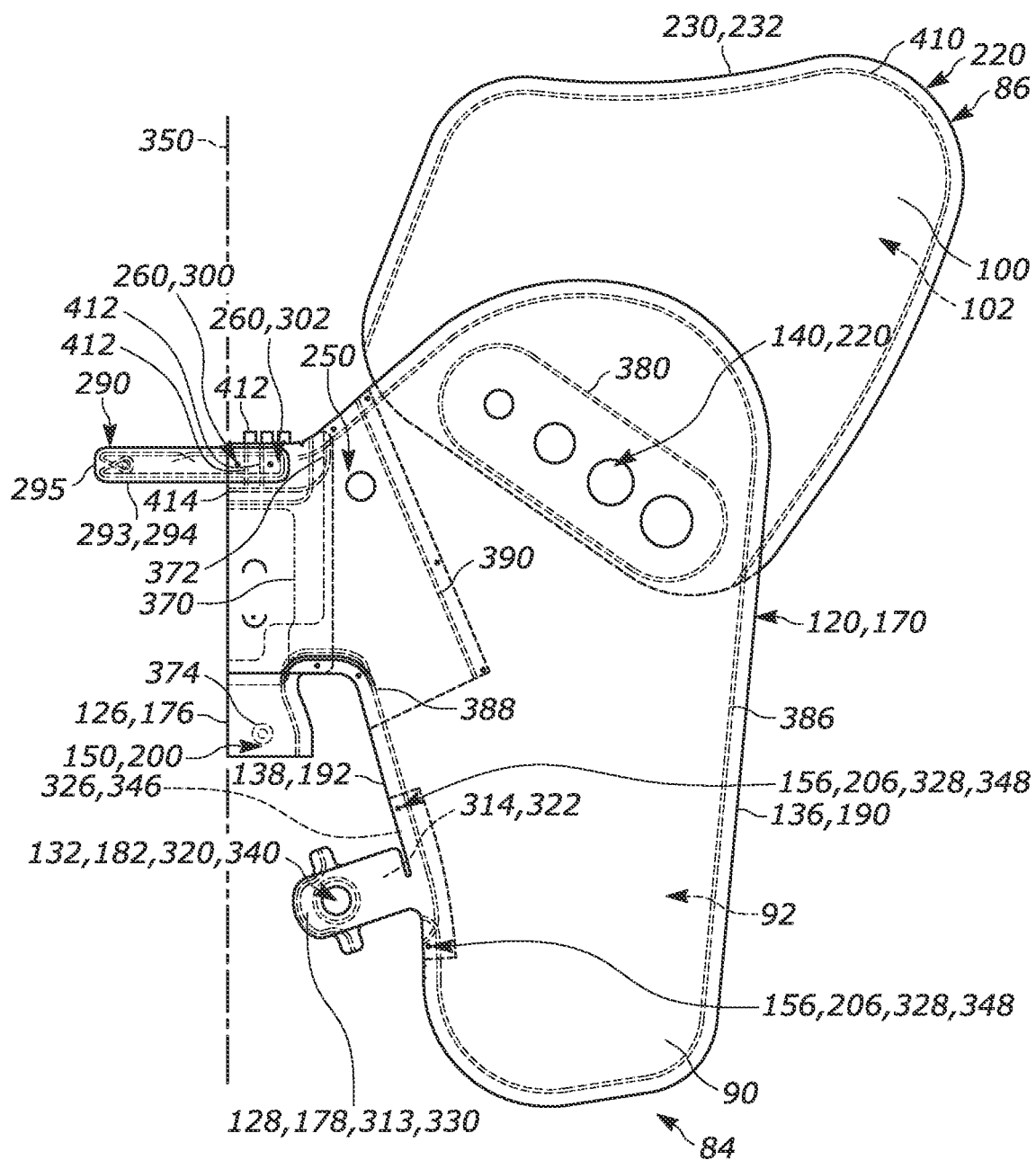
FIG. 13 is a top view of a third stage of assembling the airbag.

In the next step shown in FIG. 13, the edge portions 230, 232 of the panel 220 are secured together with stitching 410. As a result, the folded-over and stitched-together panel 220 forms the second portion 110 and define the inflatable volume 102 thereof. The inflatable volumes 92, 102 of the first and second portions 90, 92 are fluidly connected to one another by the aligned inflation openings 140, 220. Additional stitching 412, 414 extends through the panels 120, 170, 250 to further interconnect the same.

Figure 14:
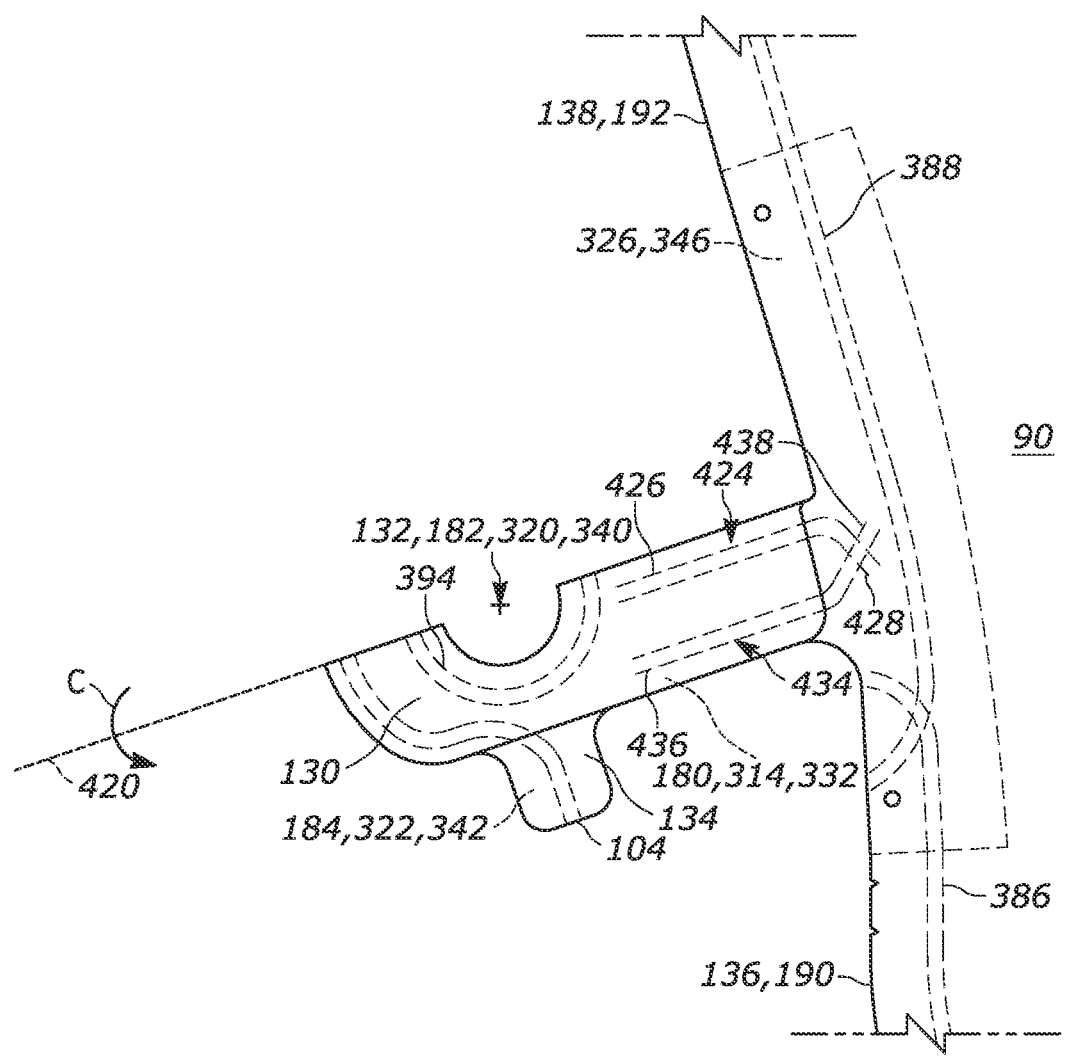
FIG. 14 is a top view of a fourth stage of assembling the airbag.

Referring to FIG. 14, the overlapping, stitched together bases 130, 180, 313, 330 are folded about a centerline 420 in the manner indicated at C. The notches 135, 185, 324, 344 (see FIG. 12B) facilitate this folding. In any case, folding the bases 130, 180, 313, 330 positions all the tabs 134, 184, 322, 342 on a single side of the aligned openings 132, 182, 314, 322. Moreover, all the tabs 134, 184, 322, 342 are aligned with and overlap one another.

Multiple sets of stitching 424, 434 extends from a first end 426 extending through the bases 130, 180, 313, 330 to a second end 428 positioned on and extending through the panels 120, 170 and overlapping tabs 326, 346 therebetween. The portions of the stitching 424, 434 positioned on the bases 130, 180, 313, 330 extend parallel or substantially parallel to one another. As shown, the portions of the stitching 424, 434 positioned on the bases 130, 180, 313, 330 also extend parallel to the centerline 420. The portions of the stitching 424, 434 positioned on the tabs 326, 426 overlap one another. In one example, the second ends 428, 438 of the stitching 424, 434 are arranged in a "X" shaped pattern.

Figure 15:
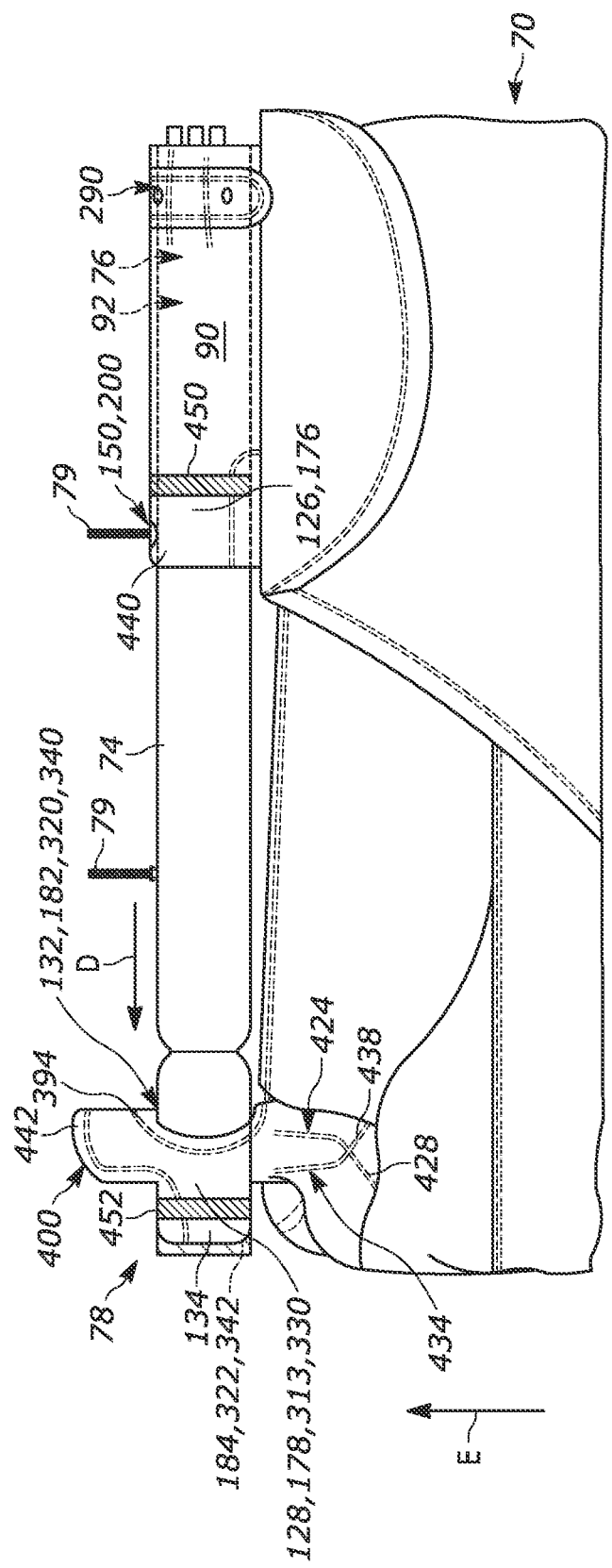
FIG. 15 is a schematic illustration of an inflator connected to the airbag.

Referring to FIG. 15, once the airbag 70 is assembled, portions of the airbag cooperate to receive and retain the inflator. In particular, a first end 76 of the inflator 74 is inserted between the first projections 126, 176 and into the inflatable volume 92 of the first portion 90 until the first end is aligned with the panel 290. In this manner, the first projections 126, 176 cooperate to form a first sleeve 440 integrally formed with the airbag 70 for receiving the first end 76 of the inflator 74. The panel 290 can be folded or wrapped around the first end 76 of the inflator 74 and stitched (not shown) or otherwise secured to the first portion 90 to help secure the first end in place.

A second end 78 of the inflator 74 is inserted through the aligned openings 132, 182, 314, 322 and between the tabs 134, 184, 322, 342 on opposite sides thereof in the direction generally indicated at D. In this way, the projections 128, 178, 313, 330 cooperate to form a second sleeve 442 integrally formed with the airbag 70 for receiving the second end 78 of the inflator 74.

The inflator 74 can be securely fastened to the first and second sleeves 440, 442 via fastener, adhesive, etc. As shown, a clip 450 extends around the first end 76 of the inflator 74 and the first projections 126, 176 and is radially compressed to securely fix the same together. Another clip 452 extends around the second end 78 of the inflator and the tabs 134, 184, 322, 342 and is radially compressed to securely fix the same together.

Once the inflator 74 is secured to the airbag 70, the airbag is at least one of rolled and folded in the direction indicated generally at E towards the inflator to a size and geometry capable of placement within the housing 69 of the module 68. Openings in the airbag 70, e.g., the openings 150, 200, allow a fastener 79 to extend therethrough to secure to the module 68 to a vehicle seat 50, roof 32, etc. One or more additional fasteners 79 can extend from the inflator 74 for further securing the same to the vehicle structure.

Referring back to FIG. 2, the inflator 74 and airbag 70 are oriented in the seat back 55 such that the second end 78 is positioned below the first end 76 and, thus, the second sleeve 442 is positioned below the first sleeve 440. When a vehicle crash is detected, the inflator 74 releases inflation gas for inflating and deploying the airbag 70. During inflation, reaction forces generated by the exiting inflation gas urge the airbag 70 away from the inflator 74, which is fixed to the vehicle structure. More specifically, the inflating airbag 70 attempts to pull away from the inflator 74 in a direction opposite the direction E of FIG. 15.

The sleeves 440, 442 and, more specifically, the second sleeve 442, is advantageously configured to withstand and disperse these pulling/reaction forces. To this end, the second sleeve 442 acts as a tether that retains the connection between the inflator 74 and the airbag 70. In the example shown, six layers of fabric connect the second end 78 of the inflator 74 to the airbag 70 in a robust manner—two layers from the panels 120, 170 and four layers from the twice folded-over panel 310. All the layers are stitched together at their bases 130, 180, 314, 332 to form a robust connection between the sleeve 442 and inflator 74. It will be appreciated that more or fewer layers can help connect the sleeve 442 to the airbag 70. That said, it will be appreciated that the multiple layers collectively form the "base", "opening", "tabs", etc. of second sleeve 442.

In any case, both the length of the bases 130, 180, 314, 332 and the stitching 424, 434 extending therethrough are aligned with and oppose the reaction/pulling forces of the operational inflator 74. Additionally, the curved/overlapping ends 428, 438 help to direct and distribute the reaction forces along the overlapping edges 136, 190 and 138, 192, respectively. That said, the stitching 424, 434 is specifically contoured to maximize the ability of the sleeve 442 to withstand reaction forces generated by the inflating airbag 70 on the second end 78 of the inflator 74. It will be appreciated that one of more features of the sleeve 442 can be adjusted/tailored depending on the particular application. For example, the size of the openings 132, 182, 320, 340, the size of the tabs 134, 184, 322, 342, the length of the bases 130, 180, 314, 332, and/or the configuration of any of the stitching 394, 400, 424, 434 can be different than illustrated to help ensure the sleeve 442 securely retains the inflator 74 and airbag 70 connected together during inflation and deployment of the airbag.

The airbag of the present invention is advantageous in that it provides a robust, integrally formed connection between the airbag and inflator that alleviates the need for additional brackets typically used to help connect the airbag to the inflator. The brackets and/or fasteners used to secure the inflator to the airbag can include sharp edges that may damage, e.g., tear, the airbag at the point(s) of attachment. The brackets used can also become bent/damaged during deployment in response to reaction forces generated by the inflating airbag. By alleviating this extra bracket, the inflator sleeve provides a way of connecting the airbag to the inflator at reduced cost and reduced risk of damage to the airbag.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for helping to protect an occupant of a vehicle seat, comprising:
   an airbag defining an inflatable volume for receiving inflation fluid from an inflator having first and second ends, the airbag having a first fabric sleeve configured to receive the first end of the inflator and a second fabric sleeve configured to receive the second end of the inflator, the first and second sleeves extending from the airbag, wherein the first sleeve is formed from a first panel folded over itself and inserted between second and third panels of the airbag defining the inflatable volume: and
   stitching extending through the first, second, and third panels.

2. The apparatus recited in claim 1, wherein the first sleeve comprises multiple layers of fabric material stitched together and extending from the airbag.

3. The apparatus recited in claim 1, wherein the stitching comprises:

first stitching extending from a first end positioned on the first sleeve to a second end positioned on a periphery of the second and third panels; and second stitching extending from a first end positioned on the first sleeve to a second end positioned on the periphery of the second and third panels, wherein the first ends of the first and second stitching extend parallel to one another.

4. The apparatus recited in claim 3, wherein the second ends of the first and second stitching overlap one another on the periphery of the second and third panels.

5. The apparatus recited in claim 3, wherein the portions of the first and second stitching positioned on the first sleeve extend along a length thereof.

6. The apparatus recited in claim 3, wherein the portions of the first and second stitching positioned on the first sleeve extend parallel to a fold line over which the first panel is folded over itself to form the first sleeve.

7. An apparatus for helping to protect an occupant of a vehicle seat, comprising:

an airbag defining an inflatable volume for receiving inflation fluid from an inflator having first and second ends, the airbag having a first fabric sleeve configured to receive the first end of the inflator and a second fabric sleeve configured to receive the second end of the inflator, the first and second sleeves extending from the airbag, wherein the first sleeve comprises a base extending from a periphery of the airbag, an opening for receiving the first end of the inflator, and tabs aligned with the opening and positioned on opposite sides of the inflator.

8. The apparatus recited in claim 7, further comprising a clip for extending around the tabs and the first end of the inflator for securing the same together.

9. The apparatus recited in claim 7, wherein first stitching extends around the opening.

10. The apparatus recited in claim 9, wherein second stitching extends around the first stitching and through the tabs.

11. The apparatus recited in claim 1, wherein the airbag comprises a center side air bag.

12. An apparatus for helping to protect an occupant of a vehicle seat, comprising:

an airbag defining an inflatable volume for receiving inflation fluid from an inflator having first and second ends, the airbag having a first sleeve configured to receive the first end of the inflator and a second sleeve configured to receive the second end of the inflator, the first sleeve being formed from a first panel folded over itself and inserted between second and third panels of the airbag defining the inflatable volume, wherein first stitching extends from a first end positioned on the first sleeve to a second end positioned on a periphery of the second and third panels, wherein second stitching extends from a first end positioned on the first sleeve to a second end positioned on the periphery of the second and third panels, the first ends of the first and second stitching extending parallel to one another.

13. The apparatus recited in claim 12, wherein the second ends of the first and second stitching overlap one another on the periphery of the second and third panels.

14. The apparatus recited in claim 12, wherein the portions of the first and second stitching positioned on the first sleeve extend along a length thereof.

15. The apparatus recited in claim 12, wherein the portions of the first and second stitching positioned on the first sleeve extend parallel to a fold line over which the first panel is folded over itself to form the first sleeve.

16. The apparatus recited in claim 12, wherein the first sleeve comprises a base extending from a periphery of the airbag, an opening for receiving the first end of the inflator, and tabs aligned with the opening and positioned on opposite sides of the inflator.

17. The apparatus recited in claim 16, further comprising a clip for extending around the tabs and the first end of the inflator for securing the same together.

18. The apparatus recited in claim 16, wherein first stitching extends around the opening.

19. The apparatus recited in claim 18, wherein second stitching extends around the first stitching and through the tabs.

20. The apparatus recited in claim 19, wherein the airbag comprises a center side air bag.

21. The apparatus recited in claim 1, wherein each of the first and second sleeves has a stitched connection with the airbag.

22. The apparatus recited in claim 1, wherein at least one of the first and second sleeves is formed from a panel extending into the inflatable volume of the airbag.

* * * * *